(12) United States Patent
Tietjen et al.

(10) Patent No.: US 7,903,024 B2
(45) Date of Patent: Mar. 8, 2011

(54) ADAPTIVE MOVING TARGET INDICATOR (MTI) CLUTTER REJECTION FILTER FOR RADAR SYSTEMS

(75) Inventors: Byron W. Tietjen, Baldwinsville, NY (US); Melinda M. Au, Grand Prairie, TX (US); Kevin P. Freeman, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 178 days.

(21) Appl. No.: 11/977,639

(22) Filed: Oct. 25, 2007

(65) Prior Publication Data

US 2009/0109083 A1   Apr. 30, 2009

(51) Int. Cl.
*G01S 13/52* (2006.01)
(52) U.S. Cl. .................... 342/162; 342/160; 342/91
(58) Field of Classification Search ............ 342/162
See application file for complete search history.

(56) References Cited

U.S. PATENT DOCUMENTS

| | | | | |
|---|---|---|---|---|
| 3,775,768 A | * | 11/1973 | Lisle et al. | 342/101 |
| 3,781,882 A | * | 12/1973 | Holberg | 342/92 |
| 3,882,498 A | * | 5/1975 | McGuffin | 342/91 |
| 3,995,271 A | * | 11/1976 | Goggins, Jr. | 342/91 |
| 4,132,990 A | | 1/1979 | Di Domizio et al. | |
| 4,137,532 A | * | 1/1979 | Taylor et al. | 342/93 |
| 4,137,533 A | * | 1/1979 | Briechle et al. | 342/162 |
| 4,339,754 A | * | 7/1982 | Hammers et al. | 342/89 |
| 4,529,985 A | | 7/1985 | Sawyer et al. | |
| 4,618,864 A | * | 10/1986 | Martin et al. | 342/162 |
| 4,636,793 A | * | 1/1987 | D'Addio et al. | 342/162 |
| 4,876,547 A | * | 10/1989 | Franco | 342/160 |
| 4,914,442 A | * | 4/1990 | Kretschmer et al. | 342/162 |
| 5,539,412 A | | 7/1996 | Mendelson | |
| 5,617,099 A | * | 4/1997 | Warren et al. | 342/159 |
| 5,703,593 A | * | 12/1997 | Campbell et al. | 342/96 |
| 6,400,306 B1 | * | 6/2002 | Nohara et al. | 342/25 R |
| 2008/0297416 A1 | * | 12/2008 | Samson, Jr. | 342/377 |
| 2009/0009381 A1 | * | 1/2009 | Inaba | 342/109 |

OTHER PUBLICATIONS

Harasawa et al. "An Adaptive Moving Target Indicator Using Median Filters". Electronics and Communications in Japan, Part 1. 1998. vol. 81, No. 5. pp. 41-50.*

* cited by examiner

*Primary Examiner* — Thomas H Tarcza
*Assistant Examiner* — Matthew M Barker
(74) *Attorney, Agent, or Firm* — Howard IP Law Group, PC

(57) ABSTRACT

Apparatus for providing moving target indicator (MTI) filtering in the presence of clutter for a radar receiver employing digital pulse compression to provide at an output a compressed digital pulse for application to the input of a MTI digital filter, including a digital adaptive filter of the same weight as the MTI filter and operative to receive the compressed pulse to provide at outputs of the filter a set of weighted filter coefficients, wherein the weighted coefficients are applied to the MTI filter during a predetermined clutter mode.

11 Claims, 6 Drawing Sheets

ADAPTIVE MOVING TARGET INDICATOR (MTI) CLUTTER REJECTION FILTER FOR RADAR SYSTEMS

FIELD OF THE INVENTION

The present invention relates to radar systems and more particularly to an adaptive MTI clutter rejection filter for use in such systems.

BACKGROUND OF THE INVENTION

Returns from land, sea and weather are regarded as clutter in an air search radar or in other radars. These returns can be suppressed in a signal processor of the radar system when the spectrum is narrow compared with the radar's pulse repetition rate (prf). Filters that combine two or more returns from a single range cell are able to discriminate between the desired targets and clutter. This allows the radar to detect targets with cross-sections smaller than that of the clutter. It also provides a system of preventing the clutter from causing false alarms.

Two classes of clutter filters are moving target indicator (MTI) and pulse Doppler. MTI combines a few return pulses, usually two or three, in a way that causes the clutter returns to cancel. A pulse Doppler process is class of clutter filter where the returns in each range resolution cell are gated and put into a bank of Doppler filters. The number of filters in the bank approximately equals the number of pulse returns combined. Each filter is tuned to a different frequency and the pass bands contiguously positioned between zero frequency and prf. The pulse Doppler technique is most often used in either airborne or land based target tracking radars, where a high ambiguous prf can be used, thus providing an unambiguous range of Doppler frequencies. The filter bank may be instrumented digitally by a special purpose computer formatted according to a Fast Fourier Transform (FFT) algorithm, for example.

Moving target indicator (MTI) filtering is used in many radar systems with the main purpose to reduce the amount of low or zero Doppler clutter in order to enhance the detectability of targets which may be masked by the clutter. Limitations to the degree of clutter rejection can often be limited by aspects of the system design which impact on pulse-to-pulse stability. Often, severe clutter rejection requirements can impose very strict pulse-to-pulse stability requirements on the radar systems analog electronics which can considerably increase its cost.

The present solution measures the pulse-to-pulse systematic variations of a radar system and removes them from the processing. In this way, the system pulse-to-pulse stability requirements are relaxed, which will result in less expensive hardware while improving the clutter rejection capability of the radar system.

SUMMARY OF THE INVENTION

Apparatus for providing moving target indicator (MTI) filtering in the presence of clutter for a radar receiver employing digital pulse compression to provide at an output a compressed digital pulse for application to the input of a MTI digital filter, comprising, a digital adaptive filter of the same weight as the MTI filter and operative to receive the compressed pulse to provide at outputs of the filter a calculated set of weighted filter coefficients wherein the weighted coefficients are applied to the MTI filter during a predetermined clutter mode.

DETAILED DESCRIPTION OF THE PREFERRED EMBODIMENTS

Figure 1:
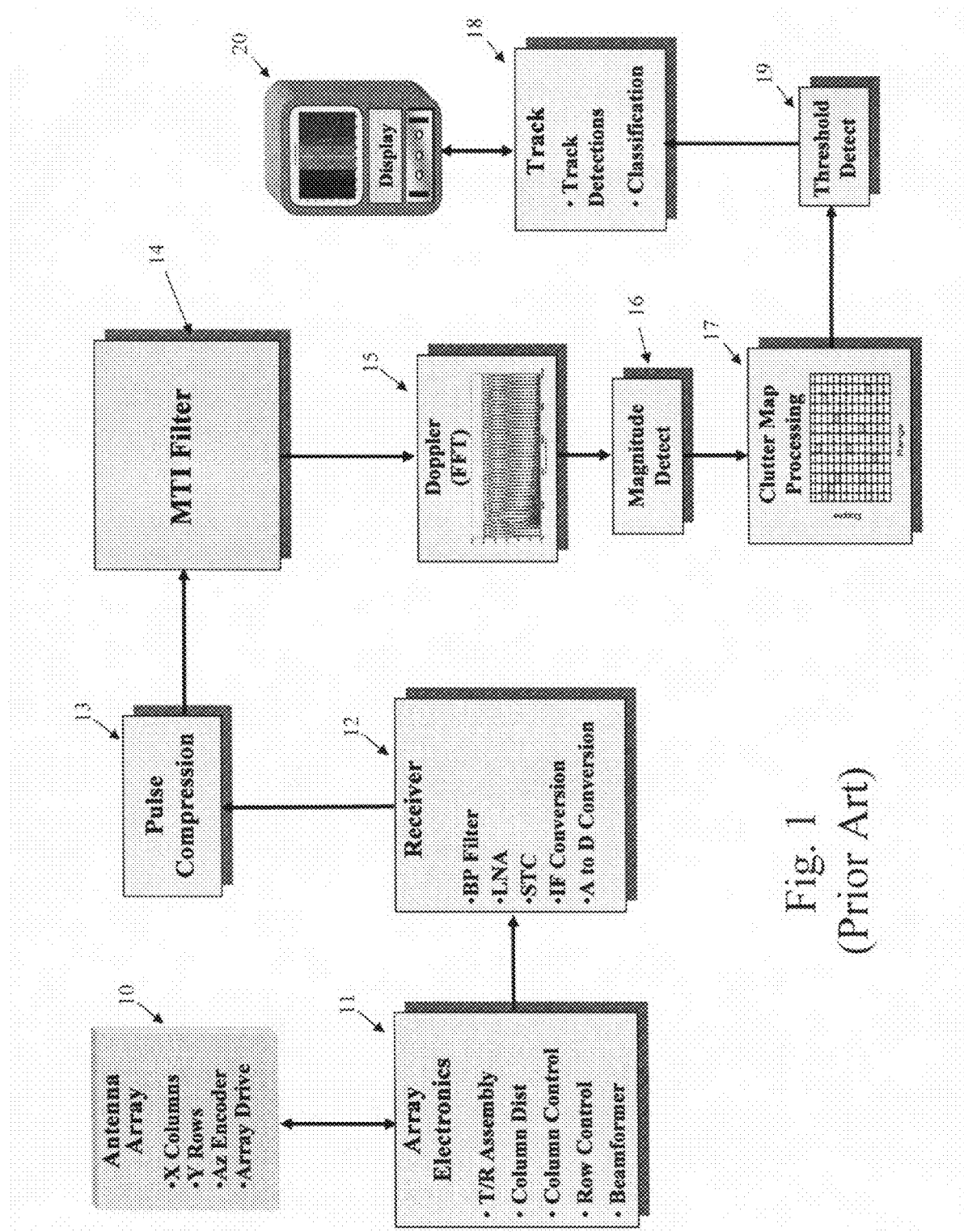
FIG. 1 is a simple block diagram of a radar receiver processor according to the prior art.

Referring to FIG. 1, there is shown a simple block diagram of a conventional radar receiver processing apparatus. Essentially the diagram of FIG. 1 shows a radar receiver based on a phased array. In any event, the main purpose of FIG. 1 is to depict the position of the MTI filter 14 which is shown in detail and which constitutes part of the prior art as indicated above.

As one can see, the radar receiver comprises an antenna array 10 such as a phased array having an array of radiating elements arranged in columns and rows. The phased array as arranged in columns and rows will receive echo signals after the pulses have been transmitted and these echo signals are return signals which are received by the antenna array in the receiving mode. The antenna array includes an AZ or Azimuth encoder which determines the position of the antenna as well as an array drive which determines how the array is energized and/or how the array will be addressed. The antenna array 10 communicates with module 11 designated as an array electronics module which includes a transmit/receive (T/R) assembly which may include a T/R switch and also has the column and row controls which can operate during the transmit mode to form the beam as determined by a beamforming circuit or module (not shown). Essentially, the phased array controller is generally a computer controlled device which includes a control computer and a tracking processor; beam steering is digitally controlled by the beam steering processor or beam former. The radar antenna array is digitally controlled and can be programmed to provide a variety of functions in rapid sequence including search, target tracking, and guidance of intercept of missiles. Such radars are known as multi-function array radars and are used in modern weapon systems, for example. The phased array radar may be used solely for search usually as a three dimensional (3-D) radar scanning in elevation as well as in azimuth or solely for tracking in which case multiple target tracking is possible through rapid sequencing amongst several targets.

The output of the array electronics module 11 is applied to the input of a receiver module 12 which in an exemplary embodiment contains a band pass (BP) filter, a low noise amplifier (LNA), a step time control (STC) module, and converter modules for performing IF conversion and analog-to-digital conversion. As one will understand, the radar receiver receives a return signal which passes from the antenna as shown in module 10 to the receiver 12 through a duplexer or T/R switch which disconnects the transmitter and establishes a low loss path to the receiver terminal. The low noise RF amplifier LNA is positioned within the receiver and prior to the band-pass filter. This is followed by a mixer for conversion to the intermediate frequency designated as IF conversion. Following amplification the signal passes to an analogto-digital converter where the signal is converted to a digital signal as indicated in module 12.

The digital signal is applied to a pulse compression module 13. The pulses from the A/D converter are applied to the input of the pulse compression module 13. The compression module 13 is a digital compressor providing at its output a pulse of a much shorter duration. Normally quadrature samples of the input pulses (IF) are digitized and stored for an interval at least as long as the transmitted pulse. The stored samples are then correlated with a set of complex weights that represent the time inverted transmit waveform. The output data stream represents time samples of the compressed IF pulse. The output of the pulse compressor 13 is input to the MTI filter 14, whose output is basically a filtered signal that is applied to a Doppler Fast Fourier Transform module 15 (FFT). The output of the Doppler module 15 is applied to a magnitude detector 16, the output of which is coupled to a clutter map processing module 17. The output of the clutter map processing module goes to the input of a threshold detector 19. The threshold detector 19 passes signals which exceed a predetermined threshold. The detector 19 determines which return signals may indicate the presence of a target. The output of the threshold detector 19 goes to a track detection and classification module 18 to determine the presence of a target which then is displayed via a display module 20. Such modules as depicted in the prior art diagram of FIG. 1 are known and will not be described further for purposes of brevity.

Thus, following amplification of the echo-signal, the signal is processed via processing circuitry intended to optimize the ratio of signal to noise and clutter. The output to the display 20 consists ideally of target echoes appearing at locations on the display corresponding to the target range and angles. In a tracking radar the signal outputs are fed back to control antenna steering and the position of the range gate in the receiver. Thus, the radar system as shown in FIG. 1, basically uses a computer control phased array antenna.

The MTI filter 14 depicted in FIG. 1 is employed to help determine the resolution of targets in the presence of clutter. In this manner the choice of the waveform of the array is often dictated by the need to resolve small targets, such as aircraft or projectiles from surrounding clutter. The clutter power at the filter output is found by integrating the response function over the clutter region, with appropriate factors for clutter density, antenna response, and the inverse fourth power range dependence included in the integrand. Signal to clutter ratio S/C for a target on the peak of the radar response is a well known equation. Reference is made to text entitled "Electronics Engineering Handbook", fourth edition by Donald G. Fink, published by McGraw Hill (1976), chapter 29 entitled "Electronic Navigation And Detection Systems".

Figure 2:
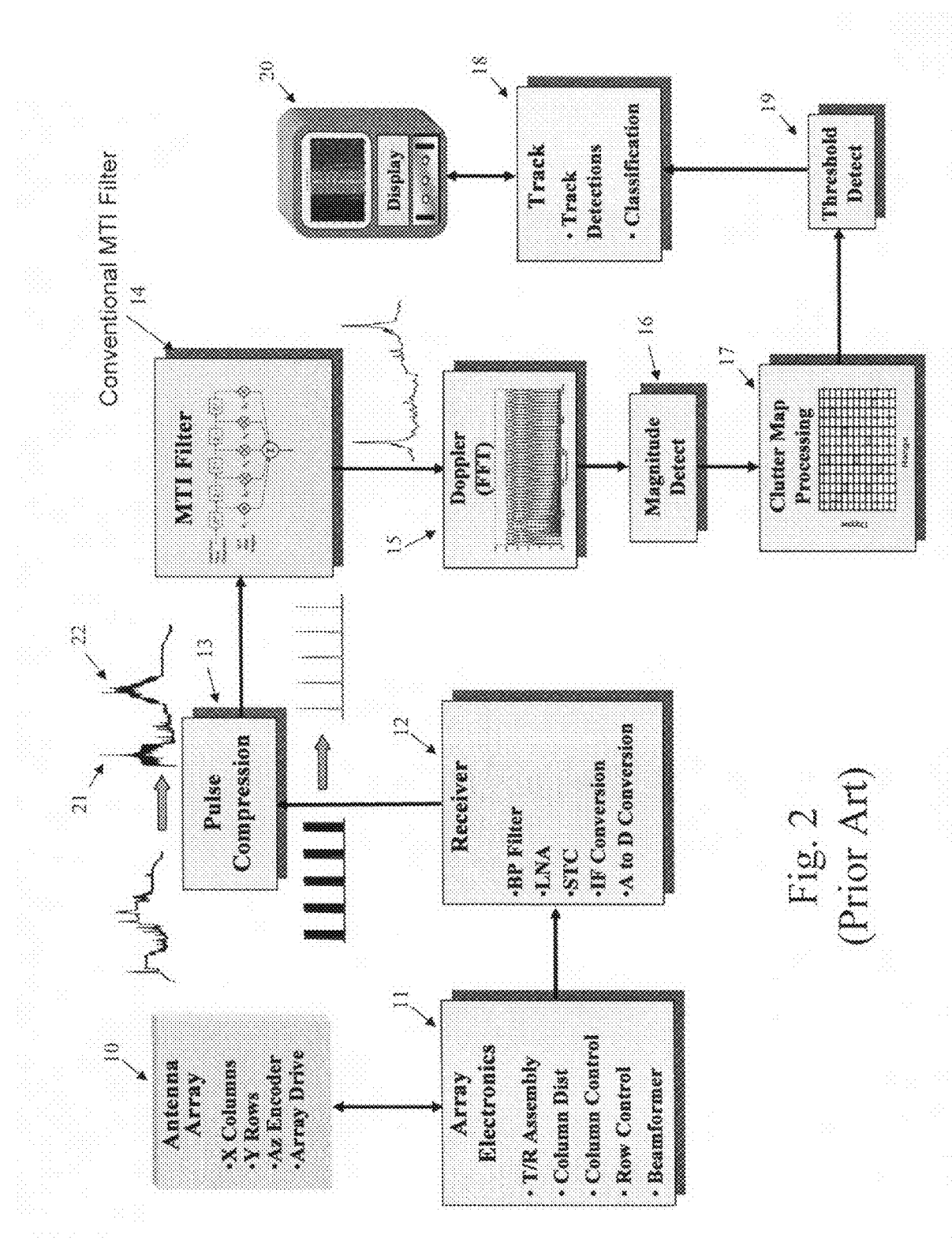
FIG. 2 is a block diagram of a radar receiver processing system with conventional MTI filtering according to the prior art.

Referring to FIG. 2 there is shown a prior art radar receiver processing flow diagram similar to FIG. 1 with the exception that the MTI filter 14 is shown as a circuit diagram. Also shown in FIG. 2 are the various waveforms present at the input and output of the pulse compressor 13 as well as the output of the MTI filter 14. As one can see from FIG. 2 the output of pulse compressor 13 shows two pulse peaks designated as 21 and 22. These peaks are indicative of large amplitude values which may be indicative of the presence of a target and will be detected by the threshold detector 19 as exceeding the background clutter. Therefore, the peaks will be processed and displayed by the display 20. As seen the MTI filter is a conventional digital filter. The digital filter basically includes a shift register which has multiplying modules and receives filter weights at each multiplying module. The input to the MTI filter is obtained from the output of the pulse compressor. The output of the MTI filter has a summation circuit which takes the outputs from the individual multipliers and sums the same to produce an output which is then processed by the Doppler FFT module.

Figure 3A:
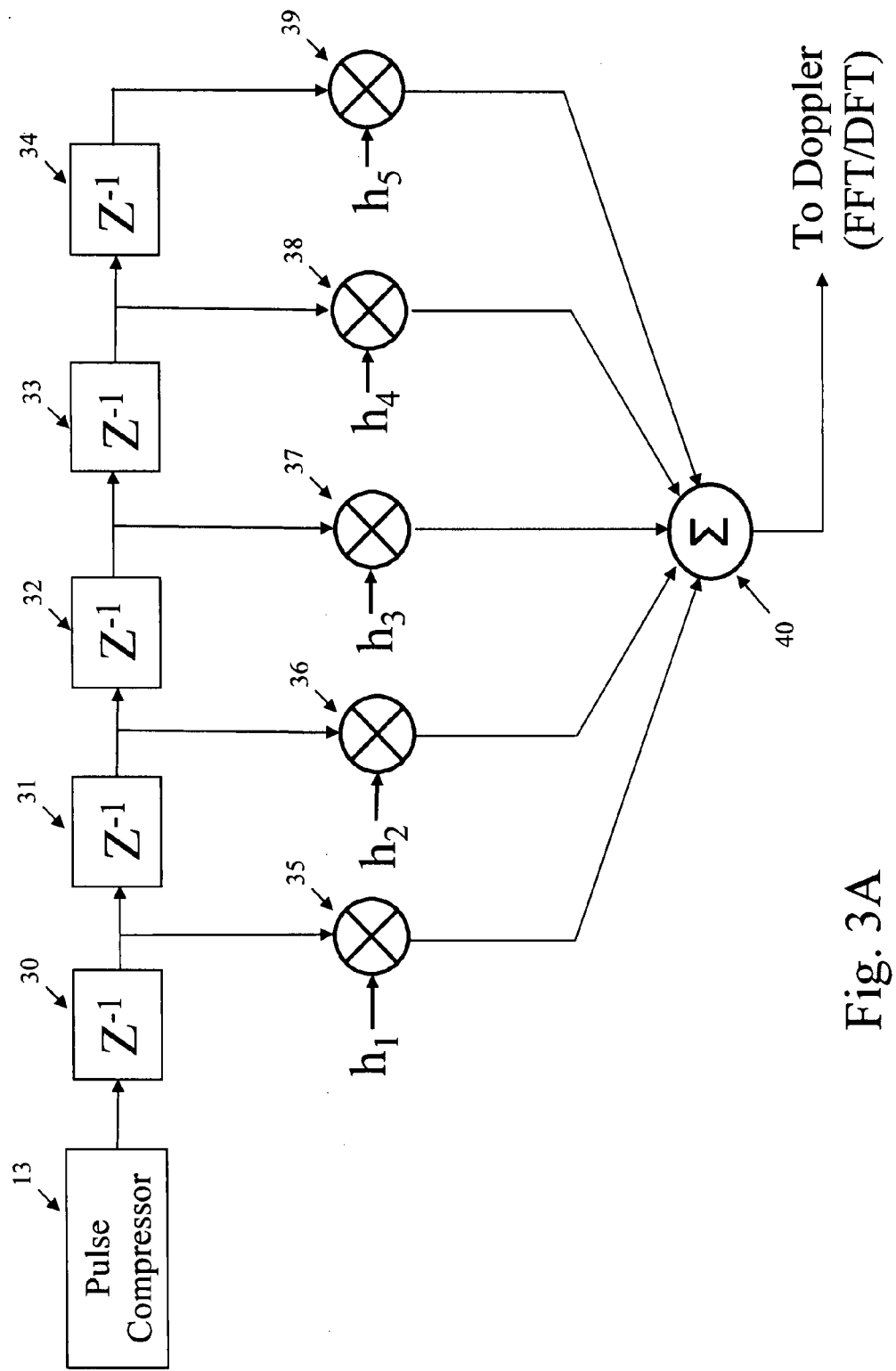
FIG. 3A is a schematic diagram of a conventional MTI filter.

The MTI digital filter is described in greater detail in FIG. 3A. A digital filter is any filter that works by performing digital mathematics on an intermediate form of a signal. Digital filters can achieve virtually any filtering effect that can be expressed as a mathematical function or algorithm. As is known many digital filters are based on the Fast Fourier Transform, which is a mathematical algorithm that quickly extracts the frequency spectrum of a signal allowing the spectrum to be manipulated before converting the modified spectrum back into a time series signal. The transfer function for a typical linear digital filter is well known and is the ratio of output and input transform expressed by the Z transform. Therefore, as seen, each of the modules of the register basically show the inverse transform ($Z^{-1}$) which delays the input pulse by one time period. Digital filters have been employed for the MTI filter in conjunction with radar systems and are well known. See, for example a text entitled "Digital Filters: Analysis, Design, and Applications" by A. Antoniou, published by McGraw Hill (1993).

As indicated above, the MTI filtering is used in prior art radar systems to reduce the amount of low or zero Doppler clutter in order to enhance the detectability of targets which may be masked by the clutter. However, there are severe limitations as to the degree of clutter rejection that can often be limited by aspects of the system design which impact pulse-to-pulse stability. Often, severe clutter rejection requirements can impose very strict pulse-to-pulse stability requirements on a radar system analog electronics, which can considerably increase its cost.

Referring to FIG. 3A, there is shown an MTI filter block diagram as employed in the prior art radar systems and as for example depicted in FIGS. 1 and 2. The filter shown includes a shift register network consisting of five stages which are designated by modules 30, 31, 32, 33 and 34. Each module is designated as by $Z^{-1}$ essentially each stage of the shift register as 30, 31, 32, 33 and 34 will delay the pulse at the input by one time unit. Also seen as part of the digital filter is the presence of multipliers 35, 36, 37, 38 and 39. Each multiplier receives at its input a delayed pulse plus a weight coefficient designated as $h_1, h_2, h_3, h_4$ and $h_5$. The outputs of the multipliers are all directed to the inputs of a summer 40 whose output is then applied to the Doppler Fast Fourier Transform or Discrete Fourier Transform (DFT) processing module 15.

As seen in FIG. 3A, the multiplier 35 receives a filter weight input designated as $h_1$ and receives the output from the pulse compressor 13 as delayed by the first stage 30 of the shift register. The output of multiplier 35 goes to an input of adder 40. In similar manner the last stage 34 which provides a delay output pulse of five times the delay of the pulse from pulse compressor 13 is applied to one input of multiplier 39 which receives at the other input the filter weight coefficient $h_5$ with the output of the multiplier 39 directed to another input of the adder or accumulator 40. As one can see, the filter shown basically is referred to in the prior art as a finite impulse response (FIR) filter. The FIR filter can be expressed in terms of a simple discrete equation as is well known. The coefficients of that equation are called filter tap weights and such a design of such filters is also well known. They exhibit many interesting characteristics whereby the impulse response exists for only N contiguous samples where N in this particular case is 5. The filter's transform function consists of zeros only and as a result the FIR is sometimes referred to as an all zero or transversal filter. The filter is a very simple design consisting of a set of shift registers, tap weight multipliers, and an adder circuit. The filter weights applied to the filter of FIG. 3A will be referred as the ideal MTI filter weights. These filter weights are employed in the present system for low noise clutter and the MTI filter operates to reduce or filter the amount of clutter thereby enabling the processing circuitry of the radar system to more easily detect the presence of a target.

Figure 3B:
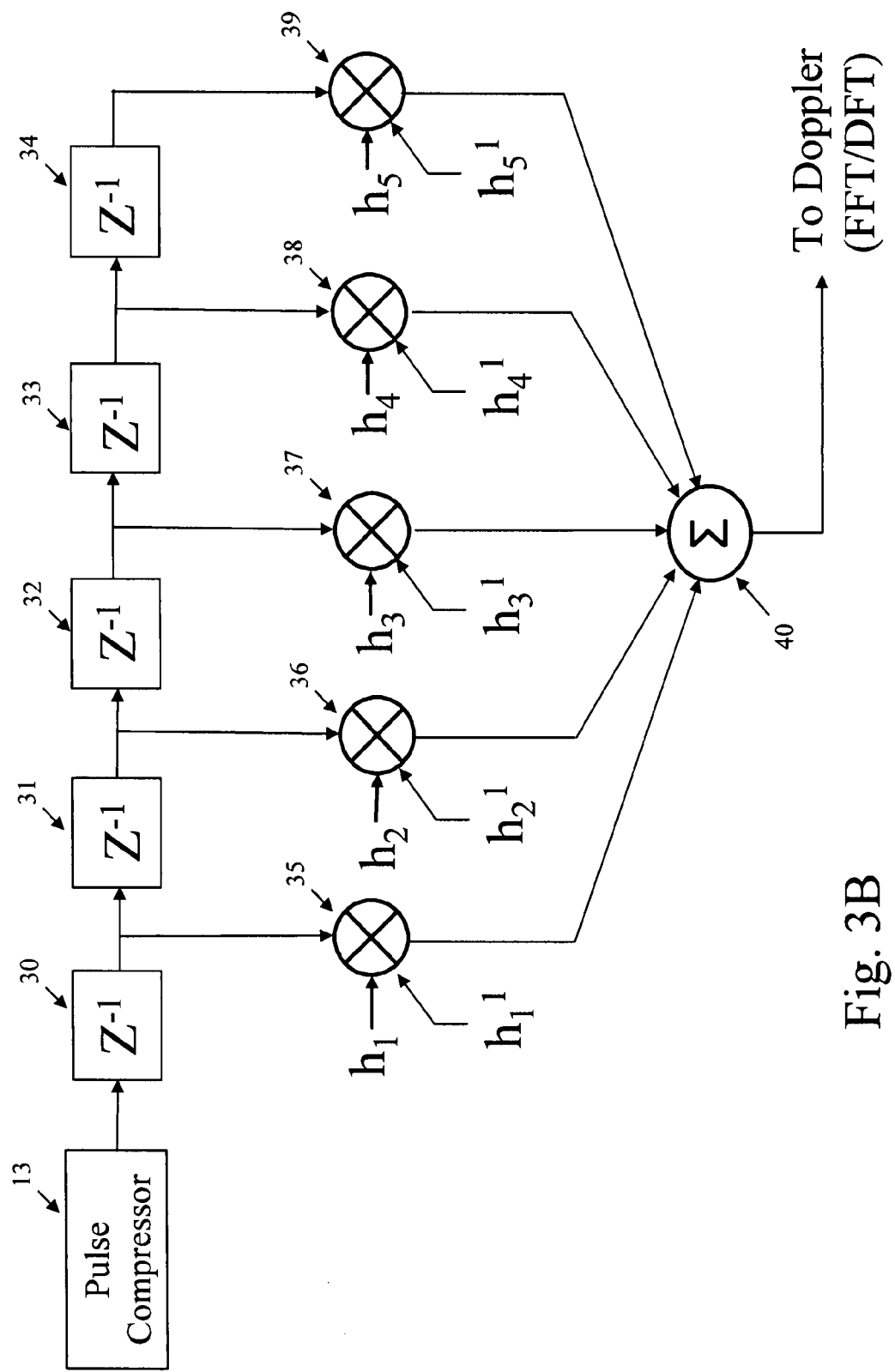
FIG. 3B is a schematic diagram of an exemplary adaptive MTI filter that utilizes separate sets of filter coefficients according to a switching condition.

The present invention employs an adaptive weight MTI filter (AWMF). The adaptive weight MTI filter (AWMF) keys on known zero Doppler clutter for reference and adapts its weights to nullify the reference clutter. The adaptive weight MTI filter produces a new set of weight inputs for the multipliers as 35, 36, 37, 38 and 39 of the normal MTI filter as shown in FIG. 3B. The resulting weights are then used for all beams and ranges and used to calculate the weights for the non-zero Doppler MTI filter. These weights are calculated during a time when the clutter exceeds a predetermined threshold. When clutter exceeds a predetermined threshold as detected by the system, the system uses the modified or the adapted weight coefficients for the MTI filter. Thus, in the presence of large clutter the weight coefficients to the MTI filter are determined by the operation of the adaptive weight filter. This approach will tend to filter out systematic errors between pulses and in doing so the pulse-to-pulse matching requirements will be able to be relaxed resulting in less expensive front end electronics. Essentially the system will enable the adaptive weight MTI filter and this filter will be selected when clutter exceeds a predetermined threshold. Such threshold detection is known in the art and embodied in various conventional signal processing threshold detectors. The system will average the data at that point and adapt the weights to zero out the average data. These weights which are the multiplier weights as designated in FIG. 3B as $h_1^1$, $h_2^1$, $h_3^1$, $h_4^1$ and $h_5^1$ are applied to the MTI filter and after a period of time the clutter will decrease. Essentially an adaptive filter is a filter which self adjusts its transfer function according to an optimizing algorithm. Most adaptive filters are digital filters that perform digital signal processing and adapt their performance based on the input signal. By way of contrast a non-adaptive filter such as the filter of FIG. 3A, has static filter coefficients ($h_1$-$h_5$) which collectively form the transfer function. For some applications adaptive coefficients are required since some parameters of the desired processing operation (for instance the properties of the noise signal), are not known in advance.

Generally speaking the adapting process involves the use of a cross function which is a criterion for optimal performance of a filter. As one can ascertain as the power of digital signal processing has increased, adaptive filters have become much more common and are routinely used in devices such as mobile phones, other communication devices, camcorders and digital cameras, as well as in medical monitoring equipment. See, for example, a text entitled "Adaptive Filter Theory" by Simon Haykin, Prentice Hall, (2002), ISBN 0-13-048434-2. The text describes operation of adaptive filters. In any event, as seen in FIG. 3B, the MTI filter of the prior art also receives coefficients as $h_1^1$, $h_2^1$, $h_3^1$, $h_4^1$, and $h_5^1$. These coefficients are provided by the adaptive filter during a high clutter mode of operation. The MTI filter receives the ideal MTI filter weights as $h_1$, $h_2$, $h_3$, $h_4$ and $h_5$ during normal operation or during low noise operation. In the event of high clutter, or high noise operation, the MTI filter now receives new weight coefficients as determined by the adaptive filter. These are designated as $h_1^1$-$h_5^1$. As can be seen each of the adapted weight coefficients is applied to the respective multiplier of the MTI filter as multipliers 35 to 39 during a high clutter mode.

Figure 4:
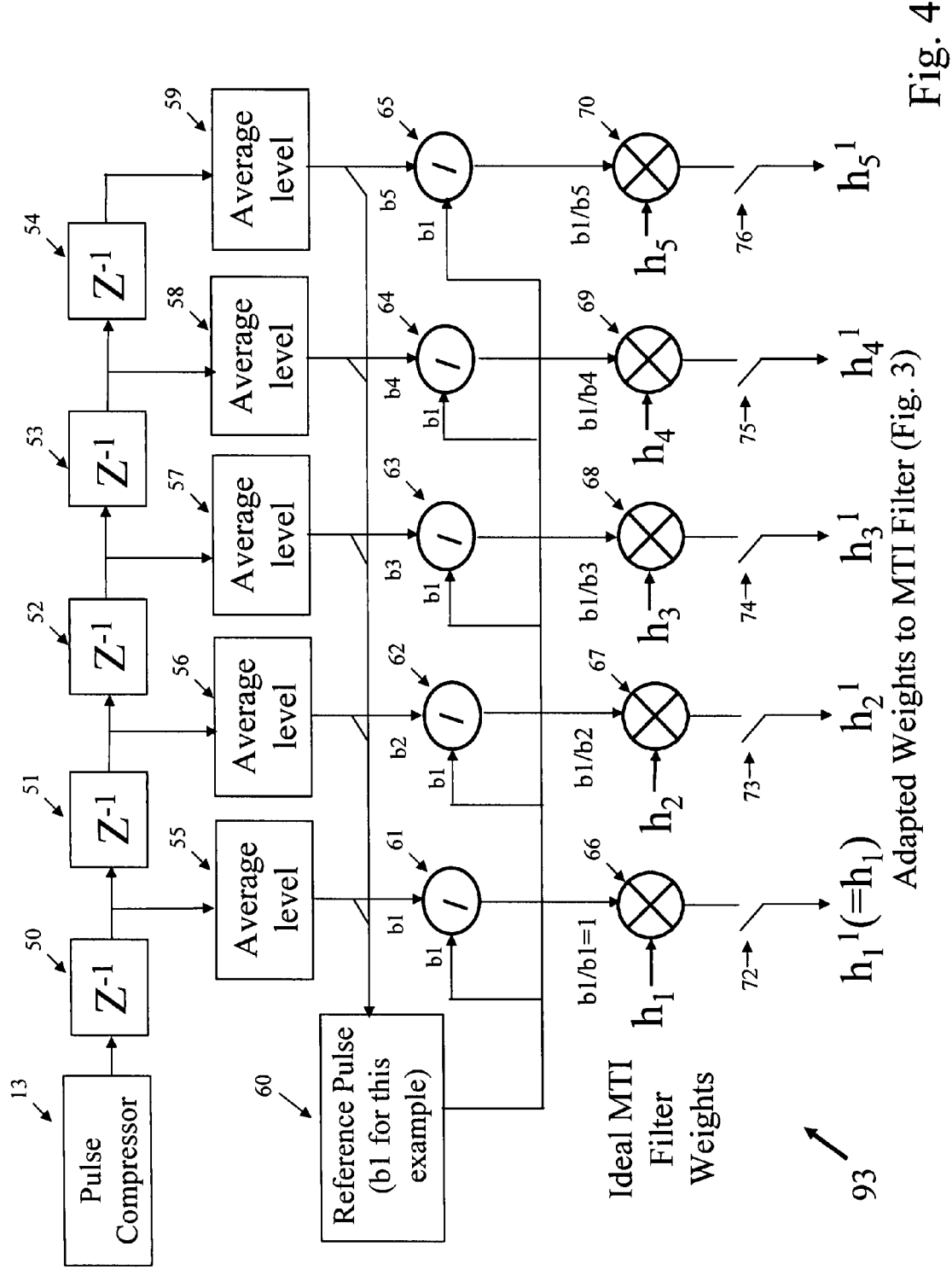
FIG. 4 is a block diagram of an adaptive weight MTI filter according to an embodiment of the present invention.

Referring to FIG. 4, there is shown an adaptive filter according to an embodiment of this invention. As seen the adaptive filter includes a five-stage shift register having an adaptive weight of 5. This is the same weight as the MTI filter. The delay stages consists of modules 50, 51, 52, 53 and 54 and essentially are the same modules as described in regard to the MTI filter of FIG. 3A. Thus, the adaptive weight modules 51 to 54 form a shift register also receiving the input from the pulse compressor 13. In any event, each tap is associated with an average level detector. Average level detector 55 has its input connected to the output of shift register stage 50, average level detector 56 is connected to the output of stage 51, average level detector 57 is connected to the output of stage 52, average level detector 58 is connected to the output of stage 53, and average level detector 59 is connected to the output of stage 54. The output of each average level detector is associated with an input of a divider. Thus, divider 61 is associated with average level detector 55, divider 62 with average level detector 56, divider 63 with average level detector 57, divider 64 with average detector 58, and divider 65 with average level detector 59.

An output from each of the average level detectors as 55, 56, 57, 58 and 59 is directed into a reference pulse generator 60. The reference pulse generator computes the average level of the pulse outputs from each average level detector and produces an average reference pulse designated as $b_1$. This pulse is then divided by the outputs of each average level detector. Thus average level detector 61 has the pulse $b_1$ divided by $b_1$, thus the output is equal to 1 and $h_1^1$ is equal is to $h_1$. The divider 62 receives at its input the average level of the output pulse of stage 56 designated as $b_2$ which divides $b_1$ whereby the output of the divider 62 is $b_1/b_2$. This is applied to the input of multiplier 67 which also receives the ideal MTI filter weight $h_2$ and produces at its output a new or an adapted filter weight of $h_2'$. In a similar manner, the output of shift register stage 52 has its average level detected by module 57 and produces an output pulse of $b_3$, which again causes divider 63 to produce an output of $b_1/b_3$. This goes into multiplier 68 which also receives the ideal MTI filter weight $h_3$ to produce at an output an adapted filter weight of $h_3^1$. In a similar manner, multiplier 69 receives at one input $b_1$ divided by $b_4$ and receives the ideal MTI filter weight $h_4$ at another input to produce at the output the adapted filter weight $h_4^1$. As seen each of the outputs of the multipliers as 66, 67 68, 69 and 70 is associated with a switch as 72, 73 74, 75 and 76. When these switches are activated, the adapted weights are applied to the MTI filter of FIG. 3. Thus, during activation of switches 72 to 76 the MTI filter of FIG. 3 receives the adapted weights as computed by the adaptive filter of FIG. 4.

In an exemplary embodiment, one formula used to measure interpulse distortion to determine adapted filter weight or correction coefficients is:

$$\delta_n(n, r) = \frac{IQ(n, r)}{IQ(n_{ref}, r)}$$

$$= \frac{|IQ(n, r)|}{|IQ(n_{ref}, r)|} e^{j(\delta\theta_n - \delta\theta_{nref})}$$

$$= \frac{\delta A_n \cdot e^{j\delta\theta_n}}{\delta A_{nref} \cdot e^{j\delta\theta_{nref}}}$$

Where n=pulse number; r=range cell; $\delta_n(n,r)$=interpulse distortion on pulse n measured at range bin r; $\delta A_n$=amplitude distortion on pulse n; $\delta\Theta_n$=phase distortion on pulse n; $n_{ref}$=reference pulse; and IQ(n,r)=range bin data (in-phase & quadrature values) at pulse n range bin r. In an exemplary embodiment, this distortion measurement process measures the amplitude and phase difference of corresponding range cells across the pulses with a complex divide operation and then averages these measured amplitude and phase differences to determine what the average bulk amplitude and phase difference is between pulses. This method may be well suited for regions of high clutter but may be sensitive to the presence of noise within the range bins on which the estimate is based. The range bins containing the largest clutter returns, and therefore the best estimates of true interpulse distortions, are effectively normalized during the complex divide to have the same amplitude as range bins containing lower clutter returns (i.e. lower CNR). This may cause the integrity of the measured interpulse distortions to be determined by the CNR of the range bins containing the lowest clutter levels. This effect may be more apparent in regions where large clutter returns are sparse. It is also to be understood that "noise" in this sense is any non-stationary artifact in the data and that the presence of large legitimate moving targets within regions of large clutter returns may also cause discrepancies in the interpulse distortion estimates since they are based on the modulation of the targets and not the transmitter hardware. The above process is expected to perform well when regions of exclusively large clutter are used for the estimates.

In another exemplary embodiment, one formula used to measure interpulse distortion to determine adapted filter weight or correction coefficients is:

$$\phi_{est}(r) = \text{mean}\{\text{Arg}\{IQ(n, r)\}, n\}$$

$$IQ_{norm}(n, r) = IQ(n, r) \cdot e^{-j\phi_{est}(r)}$$

$$IQ_{sum}(n) = \sum_r IQ_{norm}(n, r)$$

$$\delta_n = \frac{IQ_{sum}(n)}{IQ_{sum}(n_{ref})}$$

Where $\phi_{est}$=estimated mean clutter cell backscatter phase; $IQ_{norm}$=range bin data normalized by estimated interpulse phase distortion; and $IQ_{sum}$=coherently summed clutter range bin data for each pulse. In an exemplary embodiment, the above process attempts to correct for the low CNR/SCR by normalizing the phase of the clutter at each range cell and summing the clutter across range cells for each pulse directly. This allows the clutter returns from each pulse to be coherently added which naturally causes the bins with the largest clutter returns to dominate the distortion estimate. This may make the estimate more accurate. The effect of non-stationary elements within the data on the fidelity of the distortion estimate is also reduced by this method since these elements do not add coherently. While noise and targets within the data may affect the fidelity of the interpulse amplitude distortion estimate, the severity of the distortion introduced by these non-stationary elements may be reduced by applying this formula.

In still another exemplary embodiment, the distortion measurement may be implemented using the following:

$$IQ(n, r) = \delta A_n \cdot |C_r| \cdot e^{j\phi} \cdot e^{j\delta\theta_n} = \delta_n \cdot |C_r| \cdot e^{j\phi}$$

$$\delta_{n,est} = \sum_r [IQ(n_{ref}, r)^* IQ(n, r)] = \sum_r [\delta^*_{n_{ref}} \cdot \delta_n \cdot |C_r|^2]$$

$$\delta_{n,est} = \delta^*_{n_{ref}} \cdot \delta_n \cdot \sum_r |C_r|^2$$

$$\delta_{est} = \delta^*_{n_{ref}} \cdot \sum_r |C_r|^2 \cdot \begin{bmatrix} \delta_1 \\ \delta_2 \\ \delta_3 \end{bmatrix}$$

Where $C_r$=mean clutter cell backscatter amplitude; $\phi$=mean clutter cell backscatter phase; $\delta_{est}$=estimated interpulse distortion; and $\delta_1$, $\delta_2$, $\delta_3$=estimated interpulse distortion for pulses 1, 2, 3. The above process measures the correlation of the data in every pulse to a reference pulse to produce the interpulse distortion estimates. This method allows the amplitude and phase distortion estimates from the range bins containing the largest clutter returns to be weighted larger in proportion to their power than the range bins containing lower clutter returns. Since the range bins containing the largest clutter returns are also likely to have the highest CNR/CSR, this method may yield more accurate interpulse distortion estimates for amplitude and phase of the three exemplary measurement processes and may offer improved filter results using data containing high and low clutter returns.

It is understood that such distortion measurements and processing operations as described herein may be implemented in software, hardware, firmware or combinations thereof using a processor such as a microprocessor, for example, and more particularly a digital signal processor, as is understood by one of ordinary skill in the art.

Figure 5:
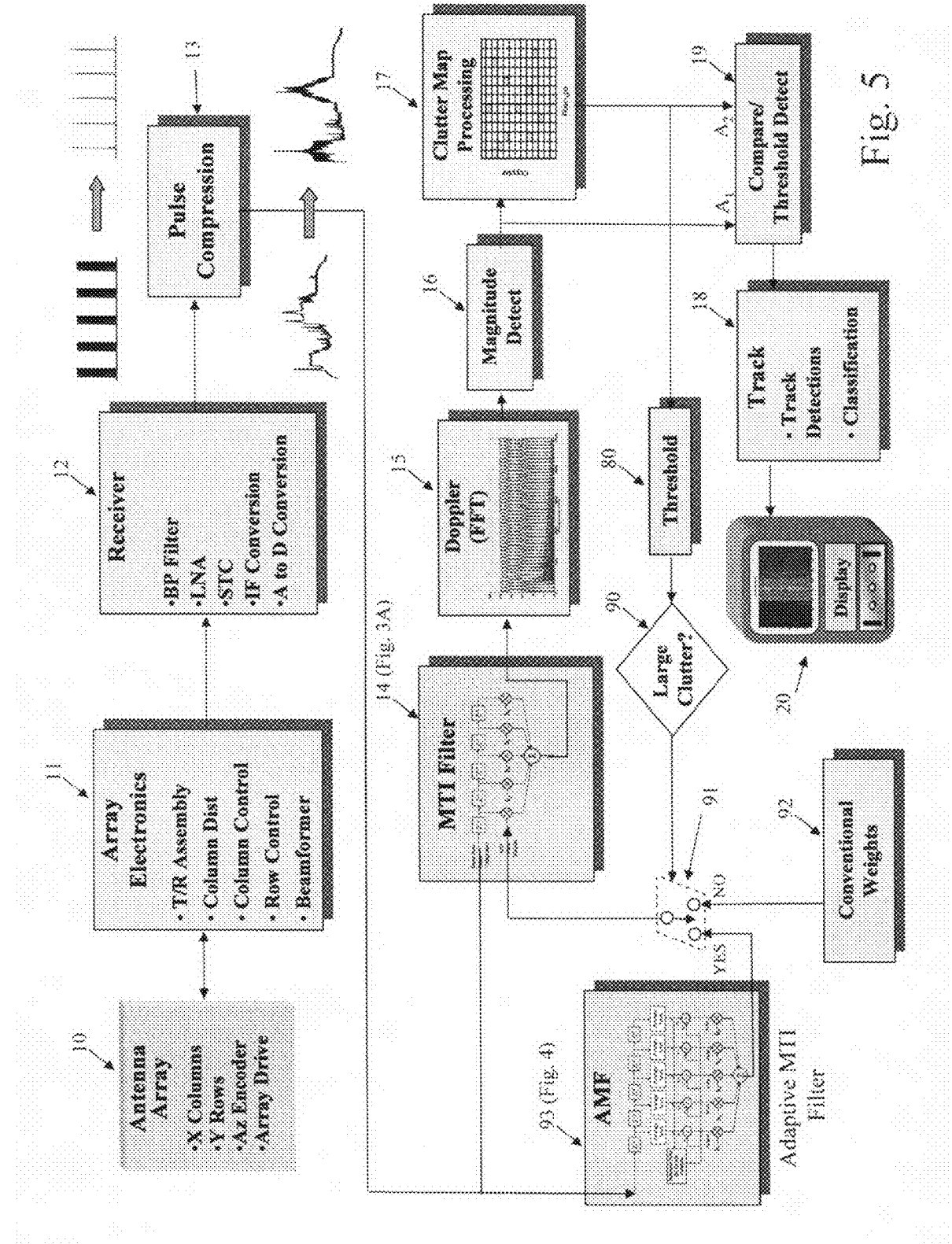
FIG. 5 is a block diagram of a radar receiver processing unit according to an embodiment of the present invention employing both an adaptive MTI filter and a conventional MTI filter.

Referring to FIG. 5, there is shown a radar receiver processing flow diagram with adaptive MTI filtering according to an embodiment of this invention. As seen in FIG. 5, the same reference numerals have been employed as shown in FIGS. 1 and 2 to indicate like functioning parts. Thus, as one can see, there is the antenna array module 10, the array electronics module 11, the receiver module 12, the pulse compressor 13 as well as the Doppler 15, the magnitude detector 16, the clutter map processing 17 and the display and the tracking mechanism/comparator 18/19 and display 20. As one can ascertain, a difference between the embodiment of FIG. 5 and FIGS. 1 and 2 is the presence of the adaptive weight filter 93 included with switch 91 and with a large clutter determination module 90 operated by a threshold detector 80. As seen in FIG. 5, during relatively low clutter, as determined by the system or by the operator the MTI filter 14 operates in a conventional manner such as the MTI filter depicted in FIGS. 1 and 2. In this mode the MTI filter receives the conventional MTI weights $h_1$-$h_5$ which are provided by module or memory 92 whereby the switch 91 is positioned in the "no" position supplying the conventional weights to the MTI filter. There is a threshold detector 80 associated with the clutter map 17. The threshold detector 80 will detect a threshold above a predetermined value which is basically determined by the largest value of clutter or by any value selected by the operator. In any event, the threshold detector when receiving a large clutter value outputs this threshold to a determination module 90. The module 90 produces an output which will operate the switch 91. In response to a determination that the clutter value exceeds a given threshold, the switch 91 will go from the "no" position to the "yes" position. In this manner, the switch 91 which is indicative of switches 72 to 76 (as seen in FIG. 4) will provide the adaptive weights to the MTI filter. The MTI filter will now filter the pulse according to the new values or the adapted weight values. This output of the MTI filter is again processed by the Doppler module 15 for a Fast Fourier Transform (FFT) or for a Discrete Fourier Transform (DFT) for example. In a similar manner, the output from the Doppler goes to a magnitude detector where one input from the magnitude detector is input to the clutter map processing module 17 whereby clutter is processed within the Doppler end range. The output $A_1$ of the magnitude detector 16 is input to the compare/threshold detector 19 which also receives as input $A_2$ the output from the clutter map processing 17. As soon as there is a value which exceeds a predetermined threshold, the comparator 19 produces an output which goes to the track detections which may be indicative of a target and then goes to the display. In this manner, because of the adaptive weights, the invention uses known clutter to measure the pulse-to-pulse variations in attempts to remove such variations from the processing. This enables better clutter rejection than that achievable with conventional processing which does not remove these systematic variations. The operator or the system selects a region of high clutter to use, which region of high clutter is detected by threshold detector 80 and module 90.

It is assumed that the selected clutter is stable and near or at zero Doppler. The above-noted system averages each of the MTI radar return pulses with the same amount of time and then measures the relationship between them. Since the clutter is assumed to be at or near zero Doppler, these averages should be the same value. Any deviations from this will be assumed attributable to the systematic errors which impact the pulse-to-pulse relationship. The MTI filter coefficients are then adjusted as they are applied to the MTI filter by the adaptive MTI clutter rejection filter, which supplies the filter coefficients to the MTI filter during the presence of large clutter. Thus, the MTI filter coefficients are adjusted to compensate for system variations and improve the clutter rejection capability to that of the system with no systematic errors. Basically, as can be seen the above-described system basically measures pulse-to-pulse systematic variations or removes them from processing. In this manner, the system pulse-to-pulse stability requirements are relaxed and resulting in less expensive hardware while improving the clutter rejection of the system.

As indicated in the above described exemplary embodiments, the adaptive weight filter 93 keys on known zero Doppler clutter for reference and adapts its weights to nullify the reference clutter. The adapted weights are now applied to the MTI filter which operates to remove much of the pulse-to-pulse systematic errors thus enabling the system to approach its clutter rejection potential. The resulting adjusted weights during large clutter are then used for all beams and ranges and used to calculate the weights for the non-zero Doppler MTI filter.

The AWMF filter 93 may be automatically selected during the presence of a large reference clutter. This large reference clutter can be selected by the operator and activates threshold detector 80 of FIG. 5. When the input exceeds the threshold detector 80 preset value, module 90 indicates a large clutter and therefore operates switch 91 which is analogous to the switches depicted in FIG. 4. Thus, the adapted weights as determined by the adaptive weight filter 93 are applied to the MTI filter. In this manner the system averages data during large clutter and adapts the weights to zero out the average data. After a period of time the clutter of the system decreases. Thus, the approach tends to filter out the systematic errors between pulses and in so doing system pulse-to-pulse matching requirements will be able to be relaxed resulting in less expensive front end electronics for the radar system.

Thus a moving target indicator radar using MTI filtering employs an adaptive MTI clutter rejection filter. The adaptive clutter rejection filter is responsive to the output from the pulse compressor and produces at its output a set of adapted weights, which set of adapted weights are applied to the conventional MTI filter during the presence of a large clutter mode. The large clutter mode is detected by a threshold detector which interfaces with a large clutter decision module. Hence, during the presence of large clutter, a switch is activated which switch takes the adapted weights as provided by the adaptive MTI filter and applies those adaptive weights to the conventional MTI digital filter for processing during a large clutter mode. In this manner, the system enables better clutter rejection than achievable with conventional processing. The system basically averages each of the radar return pulses for the same amount of time and then measures the relationship between each. Since the clutter is assumed to be at or near zero Doppler, these averages are basically of the same value and any deviations from this are assumed attributable to system errors which impact the pulse-to-pulse relationship. Thus, the adaptive MTI filter adjusts the coefficients of the conventional MTI filter to compensate for such variations and improved clutter rejection.

While the above-noted operation has been described, it is also understood that there are many alternate embodiments that would be envisioned by one skilled in the art, including embodiments wherein an adaptive weight MTI filter may be strictly employed during all operations, thus avoiding the use of a conventional MTI filter. Thus, all such modifications and alterations will be deemed to be encompassed within the spirit and scope of the claims appended hereto.

Furthermore, switch 91 is used to indicate a mechanism for applying different weighted coefficients. It is understood that various technologies may be used to perform such application, including by not limited to conventional switches such as electromagnetic or thermostatic switches.

What is claimed is:

1. Apparatus for providing moving target indicator (MTI) filtering in the presence of clutter for a radar receiver employing digital pulse compression to provide at an output a compressed digital pulse for application to the input of a MTI digital filter, comprising:
   a digital adaptive filter of the same weight as said MTI filter and operative to receive said compressed pulse to provide at outputs of said filter a set of weighted filter coefficients;
   a comparator configured to compare a level of clutter with a predetermined threshold level; and
   a control module responsive to said comparator configured to apply said weighted coefficients to said MTI filter when said level of clutter exceeds said predetermined threshold.

2. The apparatus of claim 1, wherein a switch coupled between said MTI filter and said digital adaptive filter switchably applies said weighted coefficients output from said digital adaptive filter to said MTI filter.

3. The apparatus of claim 1, where said switch is operative in a first mode for applying a set of conventional weight coefficients to said MTI filter and operative in a second mode to apply said weighted coefficients from said adaptive filter to said MTI filter.

4. The apparatus according to claim 3, wherein said digital MTI filter includes a N stage shift register, where N is a positive integer greater than 1 with each stage having an output with each output coupled to an input of an associated multiplier, with each multiplier having an input for receiving a multiplier coefficient wherein during said first mode said multipliers receive an associated conventional weight coefficient and during said second mode said multipliers receive an associated weight coefficient from said adaptive filter.

5. The apparatus according to claim 4, wherein N=5, whereby said MTI filter has a 5 stage shift register and said adaptive filter has a 5 stage shift register.

6. Apparatus for providing moving target indicator (MTI) filtering in the presence of clutter for a radar receiver employing digital pulse compression to provide at an output a compressed digital pulse for application to the input of a MTI digital filter, comprising:

a digital adaptive filter of the same weight as said MTI filter and operative to receive said compressed pulse to provide at outputs of said filter a set of weighted filter coefficients, wherein said weighted coefficients are applied to said MTI filter during a predetermined clutter mode according to a switch, where said switch is operative in a first mode for applying a set of conventional weight coefficients to said MTI filter and operative in a second mode to apply said weighted coefficients from said adaptive filter to said MTI filter; and a threshold detector responsive to detected clutter to provide at an output a signal indicative of clutter above a predetermined level, said detector coupled to said switch to operate said switch in said second state to apply said weighted coefficients to said MTI filter.

7. A method for providing moving target indicator (MTI) filtering in the presence of clutter for a digital pulse compression radar receiver having a digital MTI filter of the type including a N stage shift register with the output of each stage coupled to the input of an associated multiplier with another input of each multiplier receiving a coefficient for determining the filter response during radar operation; the method comprising the steps of:

calculating coefficients for each multiplier;

comparing a level of clutter to a predetermined threshold value;

determining if said level of clutter exceeds said threshold value;

applying said calculated coefficients to said multipliers when said clutter level exceeds said threshold value; and applying another set of coefficients to said multipliers when said clutter level does not exceed said threshold value.

8. The method according to claim 7, wherein the step of calculating includes, employing a digital adaptive filter of the same weight as said MTI filter in said receiver, said adaptive filter receiving said compressed pulse and operative to generate a set of coefficients for said MTI filter multipliers, determining a large clutter condition, and applying said generated coefficients from said adaptive filter to said MTI filter during said large clutter condition.

9. The method according to claim 8, wherein N=5, wherein said digital MTI filter has a 5 stage shift register as does said adaptive filter.

10. A method for providing MTI filtering in the presence of clutter for a radar receiver employing digital pulse compression to provide at an output a compressed digital pulse for application to the input of a N state digital MTI filter, comprising the steps of:

using an adaptive digital filter of N stages, applying said compressed digital pulse to the input of said adaptive digital filter to cause said adaptive digital filter to provide a set of N filter coefficients, detecting a level of clutter from a radar clutter map and comparing the detected level to a given threshold, and applying said set of N filter coefficients to said MTI filter when said detected level exceeds said threshold.

11. The method of claim 10, further comprising applying another set of N filter coefficients to said MTI filter when said detected level does not exceed said threshold.

* * * * *